Figure 1:
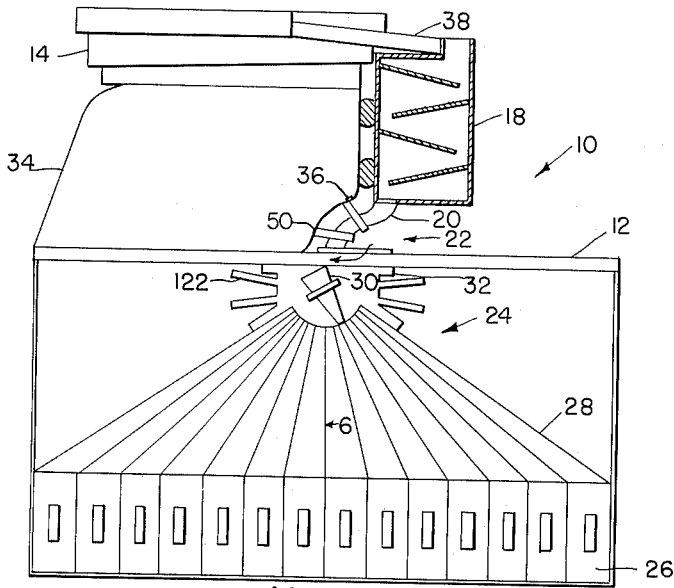

INVENTOR.
MORDECHAI WIESLER
AVIGDOR GOREN
BY Morse & Altman
ATTORNEYS

Aug. 3, 1965   M. WIESLER ETAL   3,198,330
AUTOMATIC SORTING MACHINE
Filed Dec. 5, 1962   5 Sheets-Sheet 2

INVENTOR.
MORDECHAI WIESLER
AVIGDOR GOREN
BY
*Morse & Altman*

ATTORNEYS

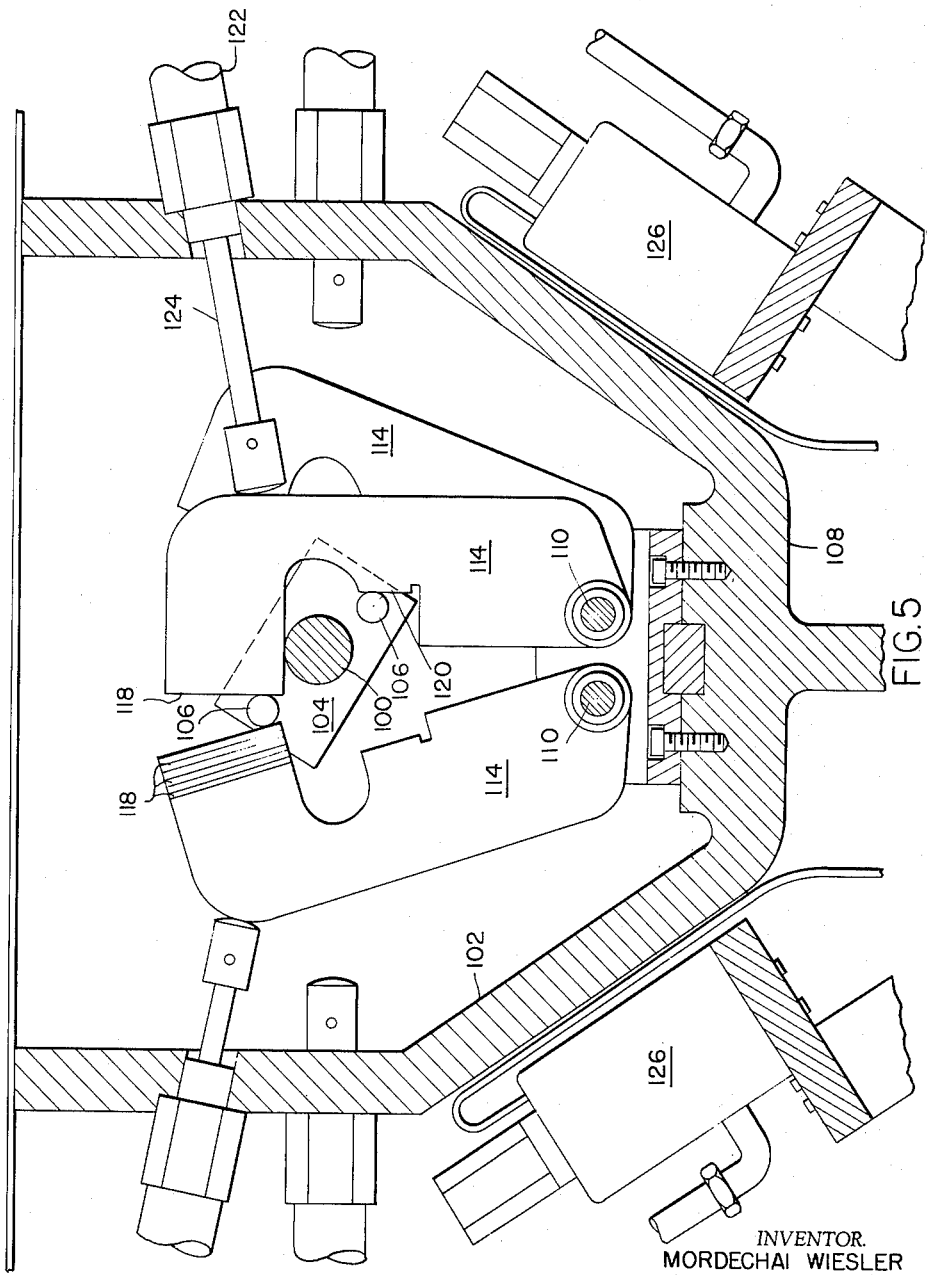

Aug. 3, 1965    M. WIESLER ETAL    3,198,330
AUTOMATIC SORTING MACHINE
Filed Dec. 5, 1962    5 Sheets-Sheet 4

INVENTOR.
MORDECHAI WIESLER
AVIGDOR GOREN
BY
Morse + Altman
ATTORNEYS

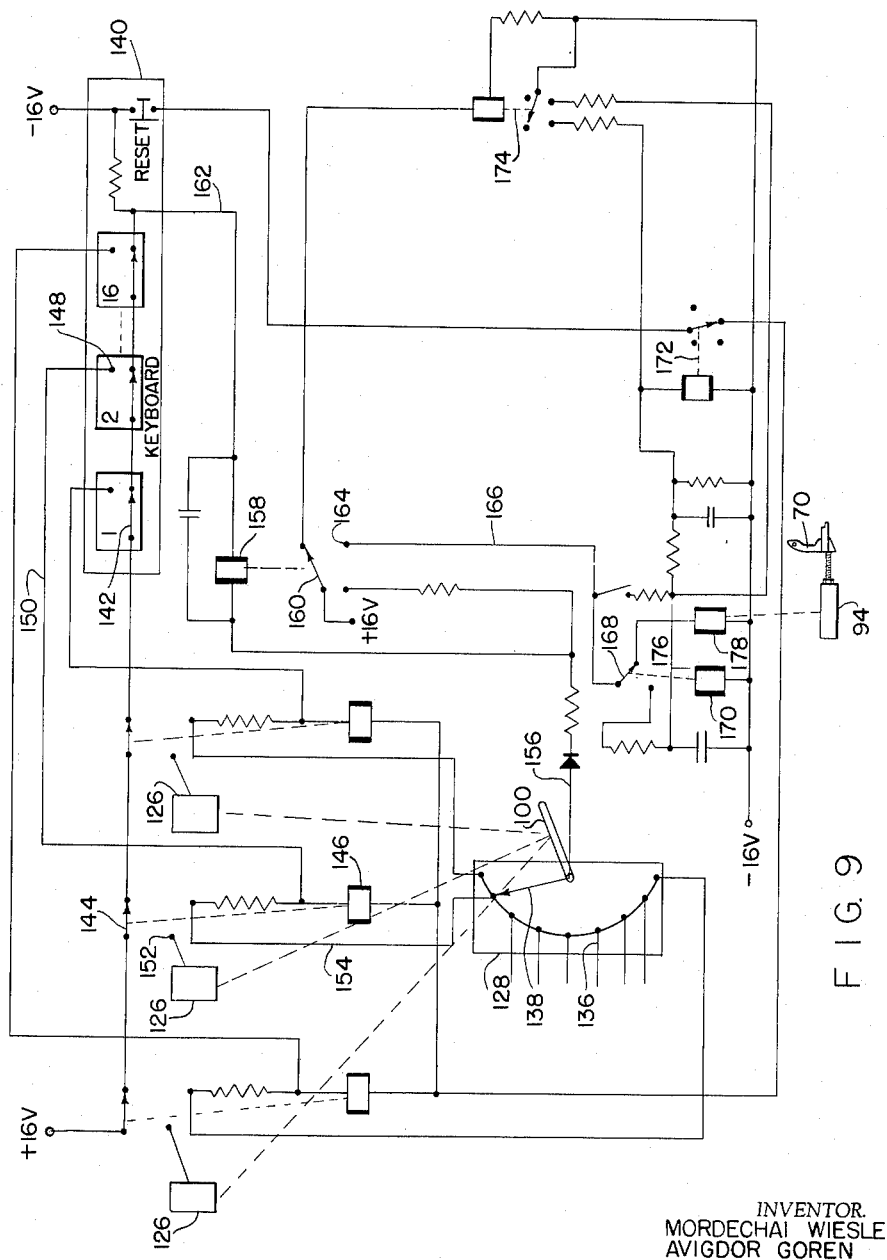

United States Patent Office 3,198,330
Patented Aug. 3, 1965

3,198,330
AUTOMATIC SORTING MACHINE
Mordechai Wiesler, Brookline, and Avigdor Goren, Cambridge, Mass., assignors to Transistor Automation Corp., Cambridge, Mass., a corporation of Massachusetts
Filed Dec. 5, 1962, Ser. No. 242,475
4 Claims. (Cl. 209—74)

This invention relates generally to automatic sorting machines and more particularly is directed towards a new and improved apparatus for quickly and accurately classifying large numbers of similar components according to common characteristics. The invention is particularly useful in the automatic testing and grading of electrical and electronic components such as semi-conductor diodes and the like.

In the manufacture of various electronic components, such as semi-conductor diodes and the like, there normally arises variations in the functional characteristics of individual components from a given batch manufactured under substantially the same conditions. These variations are due primarily to the fact that very small amounts of impurities included in the semiconductor will produce marked differences in operating characteristics of otherwise similar components. Departures from specifications and various irregularities in dimensions and the like also result in a variety of grades in a given group of components. In any event, a group of similar, mass-production components may be classified into a plurality of groups according to their operating characteristics including a group which may be entirely inoperative.

Normally, such components may be manually tested to determine their operating characteristics and then sorted. This technique is quite time consuming and, by reason of the human factor, not entirely reliable. In addition to the slowness and the lack of positive quality control in separating group components according to their common characteristics, there is also involved the high cost of labor which would be required for such a tedious task. In any event, existing techniques for sorting components by their common characteristics are slow and not particularly reliable.

Accordingly, it is an object of the present invention to provide an automatic sorting apparatus that is completely reliable and adapted to function at a high rate of productivity.

Another object of this invention is to provide an automatic sorting machine adapted to test, gauge and classify components according to their common characteristics and to physically separate them according to these characteristics.

Still another object of this invention is to provide a reliable sorting apparatus adapted to function with various testing or gauging systems and to function either manually or automatically in conjunction therewith.

More particularly, this invention features an automatic sorting machine in which a large quantity of individual components are fed automaticaly one by one from a feeding station to a testing station where the component is automatically checked for operativeness and for determining its functional characteristics. From the testing station the component is delivered to one of a plurality of bins by means of a distributing mechanism which acts in response to an input signal developed at the test station. This invention also features a feedback arrangement between the distributing mechanism and the feedback station to insure that the distributor is in the proper position so that the tested component will be delivered to its proper bin. As another feature of this invention, the distributing mechanism employs a novel system for rotating the distributor head to its proper angular position, rapidly and positively locking it in its correct position. This is carried out by employing rods mounted parallel to the shaft and engageable wth the profiled faces of multiple cams which are individually actuated and adapted to rotate the shaft to one particular angular position.

Figure 2:
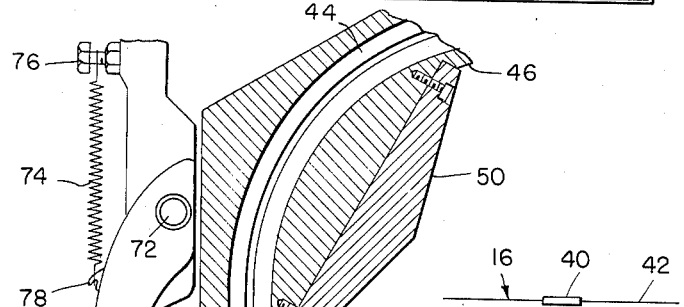
Figure 3:
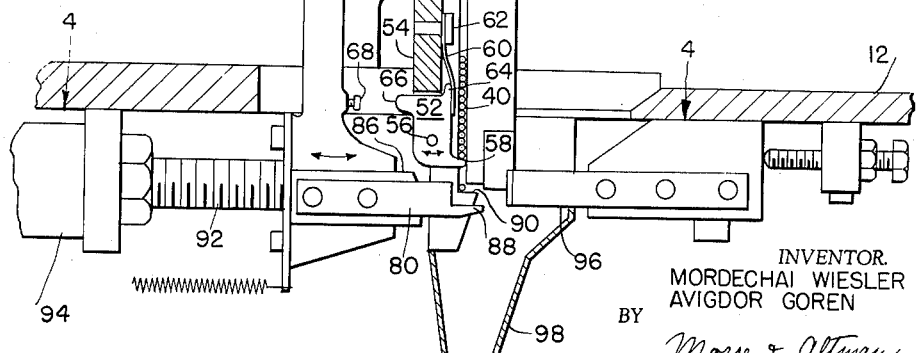
Figure 4:
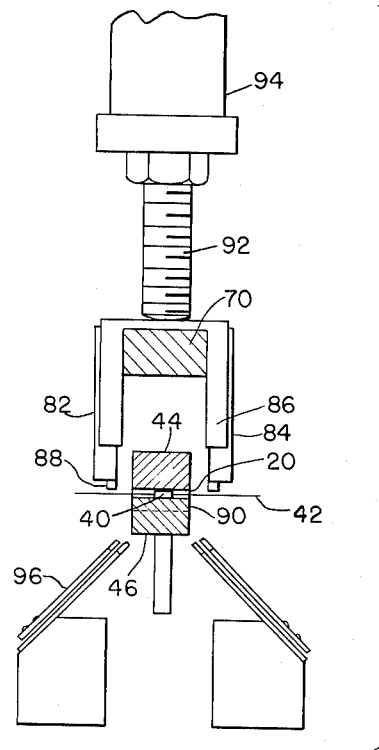
Figure 7:
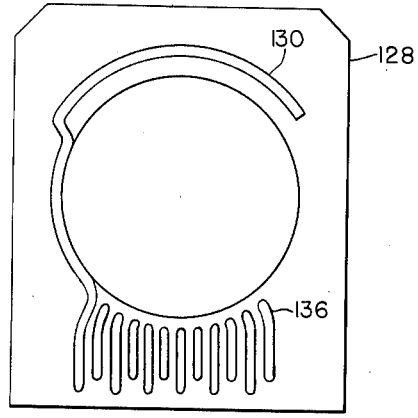
Figure 6:
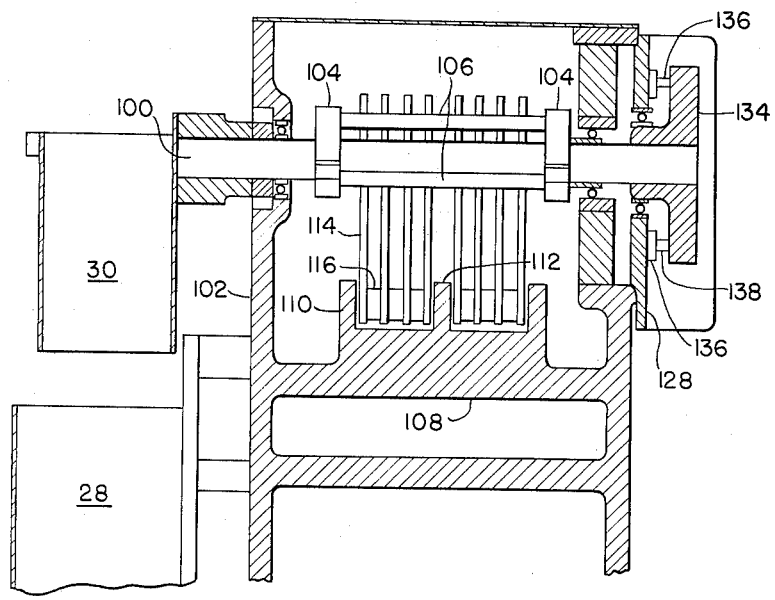
Figure 8:
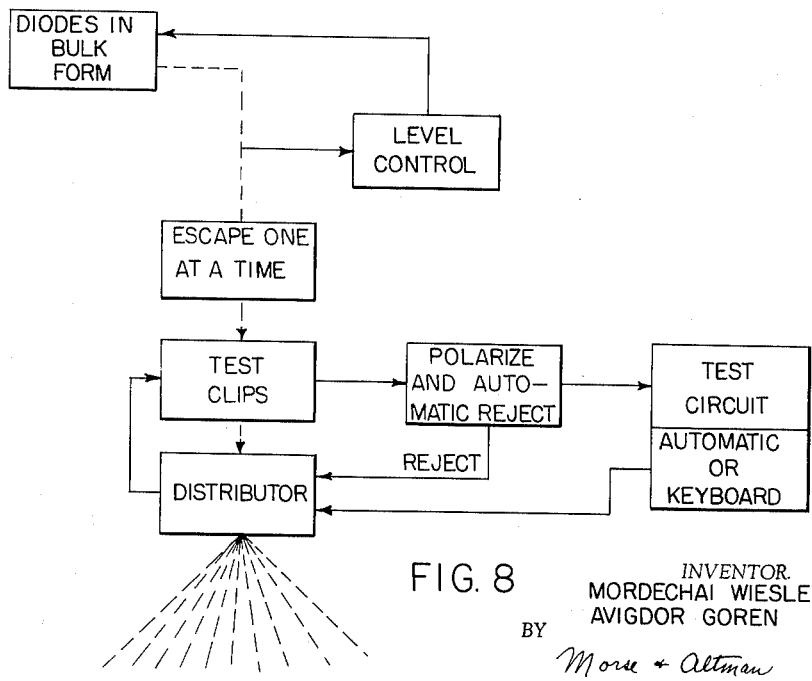

But these and other features of the invention, along with further objects and advantages thereof will become more readily apparent from the following detailed description of a preferred embodiment of the invention with reference being made to the accompanying drawings, in which;

FIG. 1 is a view in side elevation, partly in section, of a sorting apparatus made according to the invention, FIG. 2 is a side elevation of a typical diode component which may be tested and classified by the apparatus, FIG. 3 is a detailed fragmentary view in side elevation, partly in section, of the testing station of the apparatus of FIG. 1, FIG. 4 is a cross-sectional view taken along the line 4—4 of FIG. 3, FIG. 5 is a view in side elevation partly in section of the distributing mechanism, FIG. 6 is a cross-sectional view taken along the line 6—6 of FIG. 1, FIG. 7 is a side elevation of a printed circuit component forming part of the shaft position encoder, FIG. 8 is a block diagram of the sorting apparatus in conjunction with a typical test system, and, FIG. 9 is a schematic diagram of the sequence timing circuit.

Referring now to the drawings, reference character 10 indicates an automatic sorting apparatus generally organized about a boxed console cabinet 12 on which is mounted a vibratory bowl feeder 14 and which is adapted to feed semiconductor diodes 16 and like coaxial components (FIG. 2) into a baffled chute 18. From the chute 18 the diodes are delivered down a guideway 20 to a test station 22 where the characteristics of the component may be determined by suitable testing circuit. From the test station 22 the component is dropped into a distributing station 24 where the diode is delivered to one of a plurality of bins 26 according to its electrical characteristics as determined at the test station. The diistributor station 24 will be seen in FIG. 1 to include a plurality of inclined chutes 28 leading to the individual bins 26 at the top of which is located a pivotal funnel 30 whose angular position of feed is controlled by a high-speed multi-position actuator 32.

The driving mechanism for the vibratory bowl feeder may be mounted in a housing 34 which may also support driving means for separately vibrating the chute 18. In practice, the chute 18 is vibrated continuously during the operation of the apparatus while the vibratory bowl feeder is driven only for periods sufficient to keep the diodes at a predetermined level within the guideway 20. This is achieved by mounting a photo-electric cell 36 directly behind the guideway and including the photo cell in a switching circuit for actuating the feeder when the diodes drop below the photo cell position.

In detail, the diodes are fed from the feeder 14 through a tube 38 which delivers the diodes one by one onto the top baffle of the chute 18. The diodes drop back and forth across the oppositely inclined baffles and descend in a horizontal position into the guideway 20. As will be seen in FIG. 2 the diode comprises a minute body portion 40 of semi-conductor material and oppositely extending leads 42. The guideway 20 follows a curved course and is formed by an inner track 44 and an outer track 46 having matching contours on their opposing faces and slightly spaced from one another to define a gap 48 of a width to permit the passage of a diode body. The track members 44 and 46 are mounted to the front end of the housing 34 by means of rigid strap members 50.

A supply of diodes are stacked on top of one another in the guideway 20 and held ready for testing by means of a trigger 52 which is pivoted to a frame member 54 by a pin 56. The trigger will be seen in FIG. 3 to be formed with an angular catch portion 58 which is adapted to engage the lowermost diode 16 and support the column of components in the guideway 20. The trigger is normally biased into the diode engaging position by means of a leafspring 60 which is attached to the wall of the member 54 by a screw 62 and has its lower end bearing against a finger 64 integral with the trigger 52. The trigger 52 is also formed with a rearwardly extending boss 66 adapted to strike the head of a bolt 68 mounted on the forward lower face of an arm 70 pivoted to the housing frame 72. The arm 70 is normally urged in a clockwise direction by means of a coil spring 74 connected to the housing frame by a screw 76 and to the arm 70 by a hook 78 integral with the arm.

It will be understood that when the arm 70 is biased counterclockwise, the head of the bolt 68 will strike the boss 66 and thereby rotate the trigger 52 in a clockwise direction to pull the catch portion 58 out of the guideway 20 and permit a single diode 16 to be released. The arm 70 carries at its lower end a transfer bracket 80 which extends forwardly of the arm and right angularly thereto. The transfer bracket will be seen in FIGS. 3 and 4 to be bifurcated, having a pair of parallel leg portions 82 and 84, each having a flat, generally horizontal upper shoulder portion 86. It will also be seen that the forward ends of each leg is profiled to form a flat, generally horizontal lower shoulder portion 88.

It will be understood that when the arm 70 pivots counterclockwise the upper shoulders 86 will move forwardly on either side of the guideway 20 to a position below the column of diodes and will be spaced from the lower edge of the trigger 52 by distance sufficient to permit one diode to be dropped onto the shoulders 86. In this manner, when the trigger 52 is pivoted out of the guideway by the forward movement of the arm 70 striking the boss 66, the shoulders 86 will be in position to receive the lowermost diode which will be released by the trigger. When the arm 70 is subsequently rotated in a clockwise direction, the trigger, of course, will be biased back to its normal position by the spring 60 thereby restraining the remaining diodes into the guideway. As the arm returns to its normal position, the shoulders 86 will move out from under the released diode permitting it to drop onto an intermediate shoulder 90 which is formed on the lower end of the inner track member 44. The lower end of the outer track 46 will be seen in FIG. 3 to terminate above the intermediate shoulder 90 to permit the diode to be moved forwardly in a generally horizontal plane upon the next cycle of the arm 70. When the arm 70 is subsequently pivoted counterclockwise under the action of a piston rod 92 of a pneumatic cylinder 94 driving against the rear lower face of the arm, the forward flat vertical faces of the legs 82 and 84 will push the diode forwardly off the intermediate shoulder 90, permitting it to drop to the lower shoulder 88 of the bracket 80 which will carry it forwardly until the leads 42 of the diode come up against two pairs of contacts 96 which form part of the test circuit.

The diode will be held against the contacts long enough for the test to be completed and this test may include an automatic determination of the polarity of the diode as well as for short circuiting and particularly to grade it according to its functional characteristics. When the arm 70 is again retracted the diode will be stripped off the lower shoulder 88 by means of the forward face of the lower end of the track member 44. This will permit the tested diode to drop down a chute 98 located directly below the test station. It will be understood that for each cycle of the arm 70 subsequent diodes will be released by the trigger 52 to place them in position for transfer against the contacts 96.

Referring now more particularly to FIGS. 5 and 6, the mechanism for controlling the angular position of the pivotal funnel 30 will now be described in detail. It will be recalled that the funnel 30 feeds the tested diode into one of a battery of bins by being rotated into angular alignment with an appropriate chute 28. The funnel 30 is mounted fast to the end of a shaft 100 that is rotatably supported in a horizontal position to a frame 102. Mounted fast to the shaft 100 in spaced relation to one another are a pair of rectangular blocks 104 which support the ends of a pair of rods 106 extending parallel to the shaft 100 and along opposite sides thereof.

Spaced below the shaft 100 and being connected to the frame 102 is a transverse support 108. A pair of parallel axles 110 are passed through vertical extensions 112 of the support 108 and each carry a bank of oppositely facing cam actuators 114. The actuators are spaced along the axles 110 by means of spacer elements 116. The several cam actuators 114 are profiled at their upper ends in a distinct manner as best shown in FIG. 5. Each actuator has an upper leading edge 118 adapted to bear against the upper rod 106 and also a lower leading edge 120 adapted to bear against the lower rod 106. Each cam actuator is distinctly profiled with their leading edges being each of different extension.

Associated with each cam actuator is a pneumatic cylinder 122 each having a piston rod 124 adapted to bear against the rear edge of each actuator. It will be understood that upon actuation of one of the pneumatic cylinders, the related rod 124 will be driven against its related cam actuator to pivot that actuator about its supporting axle 110 and driving the leading cam edges 118 and 120 into contact with the rods 106. With the actuator driven toward an extreme position, the shaft 100 will be rotated to a particular angular position determined by the profiling of the particular actuator in operation. It will be understood that the shaft 100 will be locked in a given angular position by means of the leading edges 118 and 120 bridging the rods 106. Each of the several cam actuators 114 corresponds to a given angular position of the shaft 100 and by operating a selected pneumatic cylinder, any angular position of the shaft may be obtained within the range of operation.

In practice, the pneumatic cylinders 122 are controlled by means of solenoid valves 126 which function in response to an input signal originating at the test station and developed by the test circuit. It will, of course, also be understood that the angular position of the shaft 100 determines into which bin 26 the tested diode is delivered. Accordingly, the test circuit will make the determination as to which solenoid valve 126 should be actuated after each diode is tested.

In order to insure that the shaft 100 and funnel 30 are in the proper angular position after each diode is tested, a feedback system is provided to prevent spurious diodes from being mixed in with a given group. The feedback system includes a printed circuit element 128 (FIG. 6 and 7) which is mounted in fixed position near the right hand end of the shaft 100 as viewed in FIG. 6. The circuit 128 includes an arcuate conducting path 130 which remains in continuous contact with a wiper 132 mounted on a hub 134 attached fast to the shaft 100. The circuit 128 also includes a plurality of conducting segments 136 which are adapted to complete a circuit with wipers 138. It will be understood that unless the wipers 138 are in register with the appropriate conducting segment 136 the tested diode will not be released by the escapement mechanism in the test station.

The function of the feedback arrangement will be more clearly understood by reference to the schematic diagram of FIG. 9. As shown, the system is adapted to be actuated by a manually operated keyboard 140 although it will be understood that the keyboard may be replaced by an automatic system which will close appropriate switches upon a given signal from the automatic system. In practice, an operator may, by reading a meter connected to the test circuitry, determine into which bin the tested diode should be deposited and, upon making this determination, manually close one of the series of switches 142 associated with the keyboard. For convenience of identification, these switches may be serially numbered from 1 to 16, for example.

For the sake of clarity, the diagram of FIG. 9 includes only the three switches and their associated circuitry which is essentially repetitive. The keyboard switches 142 are serially connected to a power source through a series of relay switches 144. Each of the switches 144 is actuated by a solenoid 146 which is in turn controlled by one of the keyboard switches 142. It will also be seen that the switches 144 are adapted to energize the solenoids 126 which control the pneumatic cylinders 122. It will be recalled that the pneumatic cylinders 122 are adapted to pivot the cam actuators 114 which rotate the shaft 100 to the desired angular position.

By way of illustration, assume that switch number 2 of keyboard 140 is biased to contact terminal 148. It will be seen that in this position solenoid 146 will be energized through lead 150. Upon energization of solenoid 146, its associated switch 144 will be biased against a terminal lead 152 for the solenoid 126. Solenoid 126, in turn, will function to mechanically rotate the shaft 100 into the angular position associated with its cam actuator. Upon rotation of the shaft 100 the wiper arm 138 will be brought into alignment with the conductive strip 136 associated with a lead 154 and appearing on the printed circuit 128. In this position a circuit will be completed through the printed circuit via the wiper arm 138 and a lead 156. This circuit will serve to energize a solenoid 158 controlling a relay switch 160. It will be noted that the lead 156 is connected to the negative power terminal through a lead 162. Upon actuation of the solenoid 158, the switch 160 will be biased against a terminal lead 164 connected by a lead 166 to a solenoid control switch 168. A solenoid 170 associated with the switch 168 is controlled by means of a time delay relay 172 and associated with this delay relay is a time capacitor discharge relay 174. It will be understood that when the solenoid 170 is energized the switch 168 will be biased against the contact for a lead 176 to energize an escapement solenoid 178 causing the pneumatic cylinder 94 to reciprocate its piston and permit the pivoted arm 70 to rotate into its normal clockwise position thereby releasing the tested diode.

With the above system, the tested diode cannot be released into an incorrect bin since the feedback arrangement positively prevents the release of the tested diode until the funnel 30 is in its proper angular position with a chute 28. It will be understood that if the funnel is not in its proper position the wiper arm 138 will not complete a circuit with the solenoid 146 associated with whatever keyboard switch 142 has been actuated. Thus, with no voltage occurring across the connections, the diode release circuit cannot be energized.

The system is extremely responsive with an average elapsed time of 120 milliseconds from the initiating signal to a completion of the selecting operation. The transfer time of a component from the inlet to the bins is on the order of 70 milliseconds. It will be appreciated that the apparatus is extremely efficient having a minimum number of moving parts and a high degree of reliability due to the position feedback. In addition, the apparatus is adaptable for the use in testing and segregating a wide range of components and is readily adaptable to automatic, semi-automatic or manual control.

While the invention has been described with particular reference to the illustrated embodiment, it will be understood that numerous modifications thereto will appear to those skilled in the art. It will be understood that the above description and accompanying drawings should be taken as illustrative of the invention and not in a limiting sense.

Having thus described the invention, what we claim and desire to obtain by Letters Patent of the United States is:

1. Apparatus for angularly positioning a rotatable member, comprising spaced abutments fixed to said member, said abutments extending in parallel relation and along opposite sides of the axis of rotation of said member, a series of movable actuators spaced along said axis in opposing spaced relation to said abutments, each of said actuators being formed with a distinctive abutment-engaging profile corresponding to a particular angular position of said member and power means for driving said actuators selectively into engagement with said abutments to thereby rotate said member into the angular position associated with the particular driven actuator.

2. Apparatus for angularly positioning a rotatable member, comprising a pair of spaced abutments fixed to said member, said abutments extending parallel to the axis of rotation of said member and spaced from one another 180° about said axis, a series of movable actuators spaced along both sides of said axis in opposing spaced relation to said abutments, each of said actuators being formed with a distinctive abutment-engaging profile adapted to rotate said member to a particular angular position upon driving engagement with said abutments and power means for driving said actuators selectively into engagement with said abutments to thereby rotate said member into the angular position associated with the particular driven actuator.

3. Apparatus for angularly positioning a rotatable member, comprising a shaft for supporting said member, a pair of abutments fixed to and extending parallel to the axis of rotation of said shaft and along opposite sides thereof, a series of movable actuators spaced along both sides of said shaft in opposing spaced relation to said abutments, each of said actuators being formed with a distinctive abutment-engaging profile adapted to bias said shaft and its supporting member to a particular angular position upon contact with both of said abutments and power means for driving said actuators selectively into engagement with said abutments to thereby rotate said member into the angular position associated with the particular driven actuator.

4. An apparatus for physically sorting a quantity of electronic components having similar structural but different functional characteristics, comprising a testing station, means for feeding said components one by one into said dispensing station, said testing station being adapted to guage the functional characteristics of said components and to produce a signal corresponding to said characteristics, a plurality of receptacles associated with said apparatus for receiving said components, a plurality of chutes disposed radially with respect to said testing station and communicating with said receptacles, a delivery funnel pivotally mounted between said testing station and said chutes, spaced abutments fixed to and extending in parallel spaced relation to the axis of rotation of said funnel, a series of movable actuators spaced along said axis in opposing spaced relation to said abutments, each of said actuators being formed with a distinctive abutment-engaging profile corresponding to a particular angular position of said member and power means responsive to said signal for driving said actuators selectively into engagement with said abutments to thereby rotate said member into the angular position associated with the particular driven actuator and into alignment with a particular one of said chutes.

References Cited by the Examiner

UNITED STATES PATENTS

| 2,448,652 | 9/48 | Aller | 209—74 X |
| 2,975,878 | 3/61 | Cason | 209—81 X |
| 2,999,587 | 9/61 | Campbell | 209—81 X |
| 3,032,191 | 5/62 | Clukey | 209—81 X |

ROBERT B. REEVES, *Acting Primary Examiner.*

ERNEST A. FALLER, JR., *Examiner.*